April 14, 1970  D. E. OMLIE ET AL  3,505,702
WINDOW WIPING APPARATUS HAVING A LINEARLY MOVABLE WIPER
Filed April 29, 1968  4 Sheets-Sheet 1
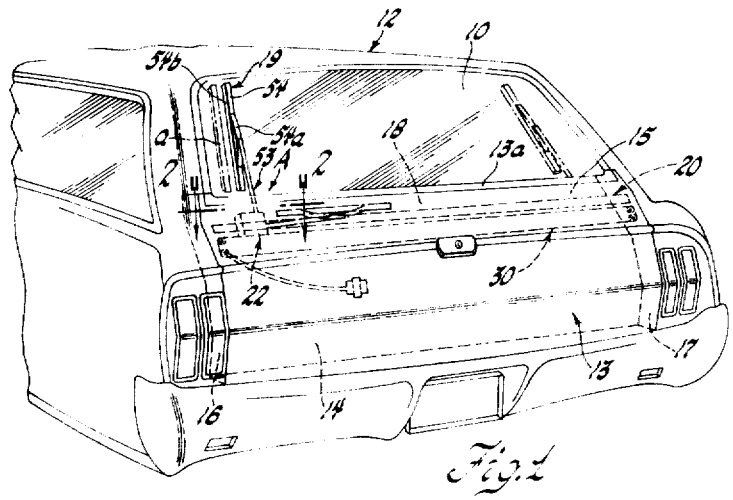
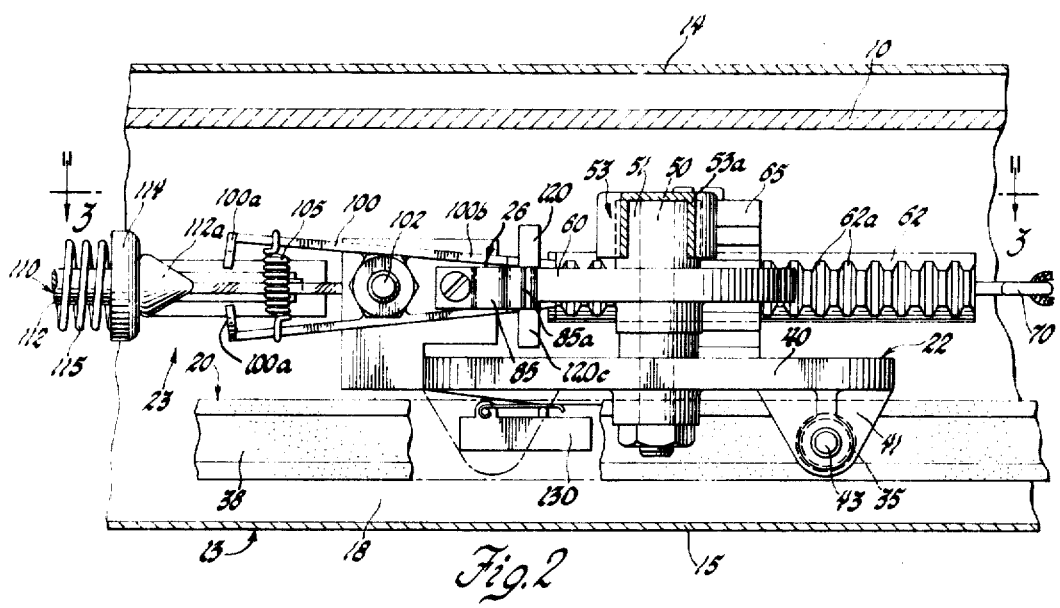
INVENTORS
Donald E. Omlie &
Ronald A. Niewolak
W. A. Schmitz
ATTORNEY INVENTORS
Donald E. Omlie &
BY Ronald A. Niewolak
W. A. Schuetz
ATTORNEY

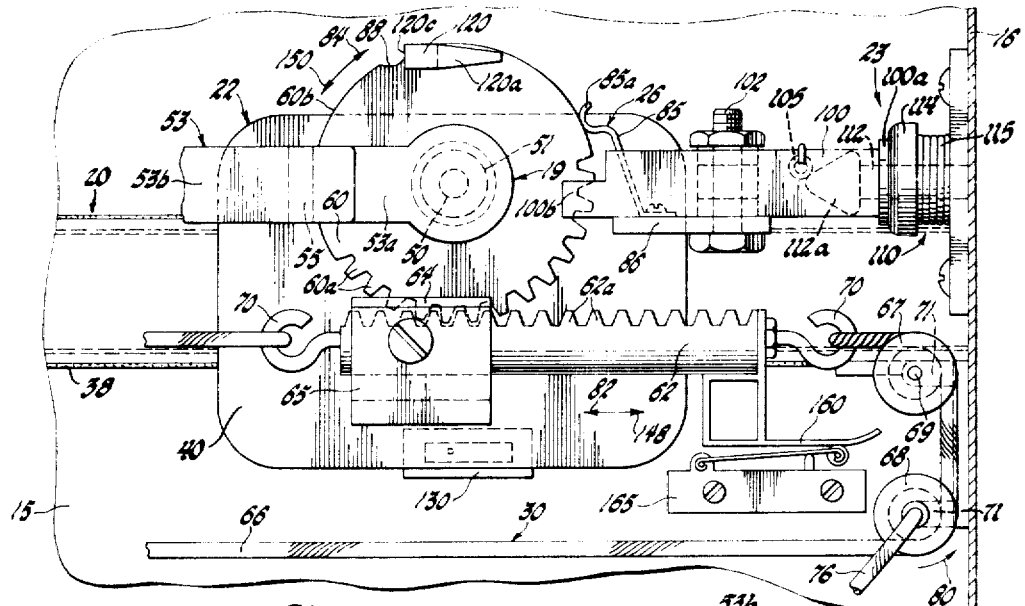
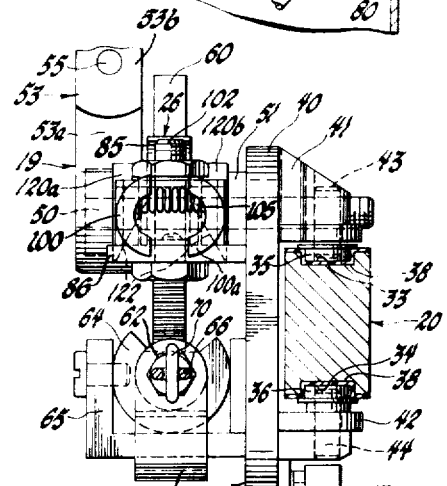
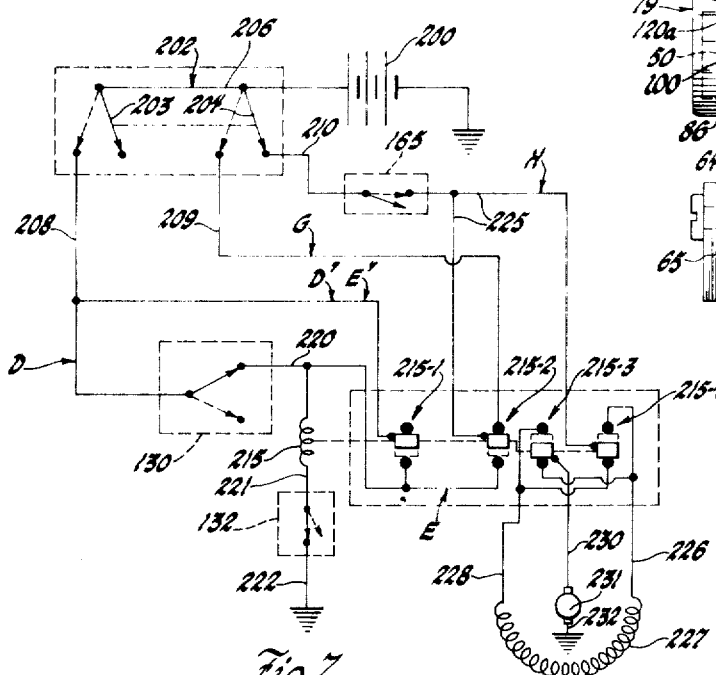

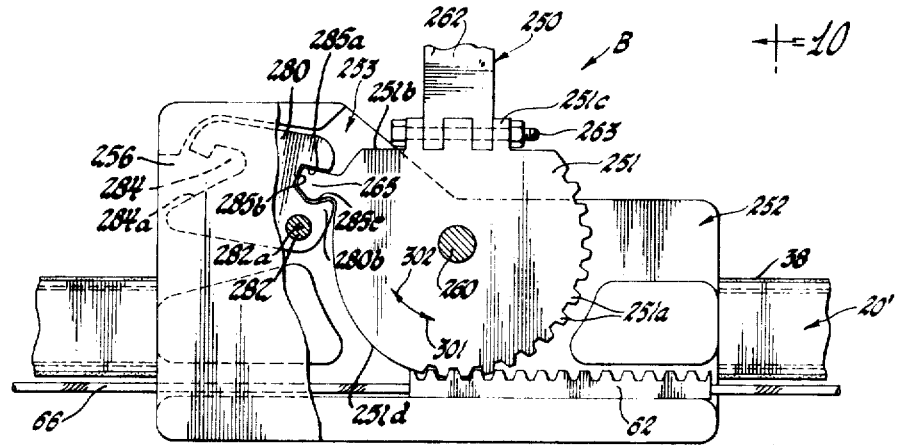
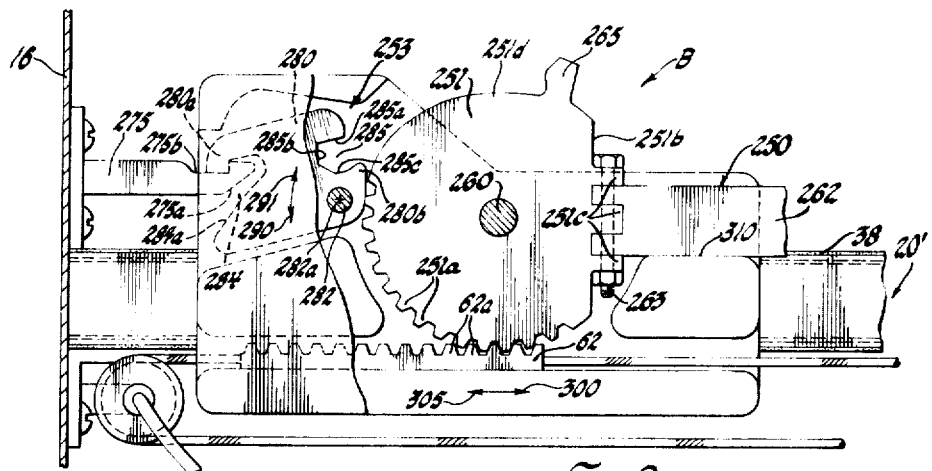
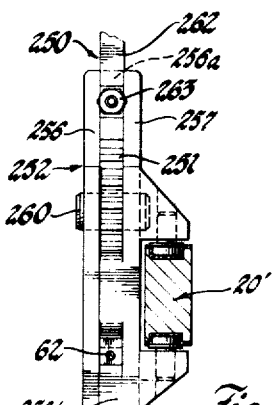

United States Patent Office 3,505,702
Patented Apr. 14, 1970

3,505,702
WINDOW WIPING APPARATUS HAVING A LINEARLY MOVABLE WIPER
Donald E. Omlie, Utica, and Ronald A. Niewolak, Warren, Mich., assignors to General Motors Corporation, Detroit, Mich., a corporation of Delaware
Filed Apr. 29, 1968, Ser. No. 724,929
Int. Cl. A47l 1/00; B60s 1/08
U.S. Cl. 15—250.17                    7 Claims

ABSTRACT OF THE DISCLOSURE

In a preferred form, this disclosure relates to a window wiping apparatus for cleaning a window of a vehicle and which is adapted to be concealed within a well or recess adjacent the lower edge of the window when not in use. The window wiping apparatus includes a carriage supported for linear movement in opposite directions, a wiper for wiping the window and which is movable between a substantially horizontal, parked position within the well when not in use and a substantially vertical, operating position during running operation. The apparatus further includes a single drive means for both linearly moving the carriage and wiper in opposite directions between first and second positions during running operation and to and from the parked position when running operation is terminated and initiated, respectively.

---

The present invention relates to a window wiping apparatus for cleaning a window of a vehicle, and in particular to a window wiping apparatus having a wiper which is linearly moved in opposite directions across the window while in a substantially vertically disposed position during running operation and which is rotated to a substantially horizontally disposed parked position when running operation is terminated.

In U.S. Patent No. 2,785,430 a window wiping apparatus is disclosed having the basic wiper movement noted above. An advantage achieved by such a wiper movement is that substantially all of the area of the window can be wiped. However, to achieve this movement, separate drive motors and drive means were provided to respectively linearly move the wipers in opposite directions across the windshield during running operation and to move the wipers between their operating positions and parked positions.

The window wiping apparatus of the present invention is an improvement over the windshield wiping apparatus shown in U.S. Patent No. 2,785,430 in that a novel, single drive motor and means is provided for both moving the wipers linearly in opposite directions across the window during running operation and for rotating the wipers to a parked position when running operation is terminated. This not only enables substantially all of the area of the window to be wiped, but results in a wiper apparatus of a more practical and economical construction.

Accordingly, an object of the present invention is to provide a new and improved window wiping apparatus of the general type referred to above and which is of a highly practical and economical construction, and in which a single drive motor and means is provided for both linearly moving the wiper across the window during running operation and to move the wiper to a parked position after running operation is terminated.

Another object of the present invention is to provide a new and improved window wiping apparatus of the general type referred to above, and which includes a carriage supported for linear movement in opposite directions and which is in a rest position when the apparatus is de-energized, a releasable latch mechanism for holding the carriage in its rest position, a wiper pivotally supported by the carriage for movement between parked and operating positions, a latch means carried by the carriage and engageable with the wiper when the latter is in its operating position to latch the same against movement relative to the carriage, and a single drive means operatively connected with said wiper and which is operable, when energized, to first move the wiper relative to the carriage from its parked position to its operating position and to effect release of the latching mechanism as the wiper reaches its operating position and then to move the wiper and carriage as a unit during running operation.

A further object of the present invention is to provide a new and improved window wiping apparatus, as defined in the next preceding object, and in which the drive means includes a pinion gear connected with the wiper and a rack in meshed engagement with the pinion gear and which is supported by a carriage for linear movement relative thereto, the rack being movable relative to the carriage when operation is initiated to move the wiper from its parked position toward its operating position until the wiper is latched to the carriage by the latch means whereupon the pinion gear and hence, the rack are locked against movement relative to the carriage and the carriage and wiper move as a unit.

Yet another object of the present invention is to provide a new and improved window wiping apparatus of the character referred to above for wiping the rear window carried by a tailgate of a vehicle, and in which the wiper is parked in a recess or chamber at the upper end of the tailgate so as to be concealed from view when not in use.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views of each embodiment, and in which:

FIGURE 1 is a fragmentary rear perspective view of a station wagon vehicle embodying the window wiping apparatus of the present invention;

FIGURE 2 is a fragmentary sectional view taken approximately along line 2—2 of FIGURE 1;

FIGURES 4 and 5 are views similar to that shown in FIGURES 2 and 3, but showing certain parts thereof in different positions, respectively;

FIGURE 6 is a fragmentary sectional view taken approximately along line 6—6 of FIGURE 3;

FIGURE 7 is a schematic electrical control diagram or system for controlling operation of the window wiping apparatus;

FIGURE 8 is a view similar to that shown in FIGURE 3, but showing an alternative embodiment of the window wiping apparatus of the present invention;

FIGURE 9 is a view similar to that shown in FIGURE 8, but showing certain parts thereof in different positions; and FIGURE 10 is a sectional view taken approximately along line 10—10 of FIGURE 8.

Figure 3:
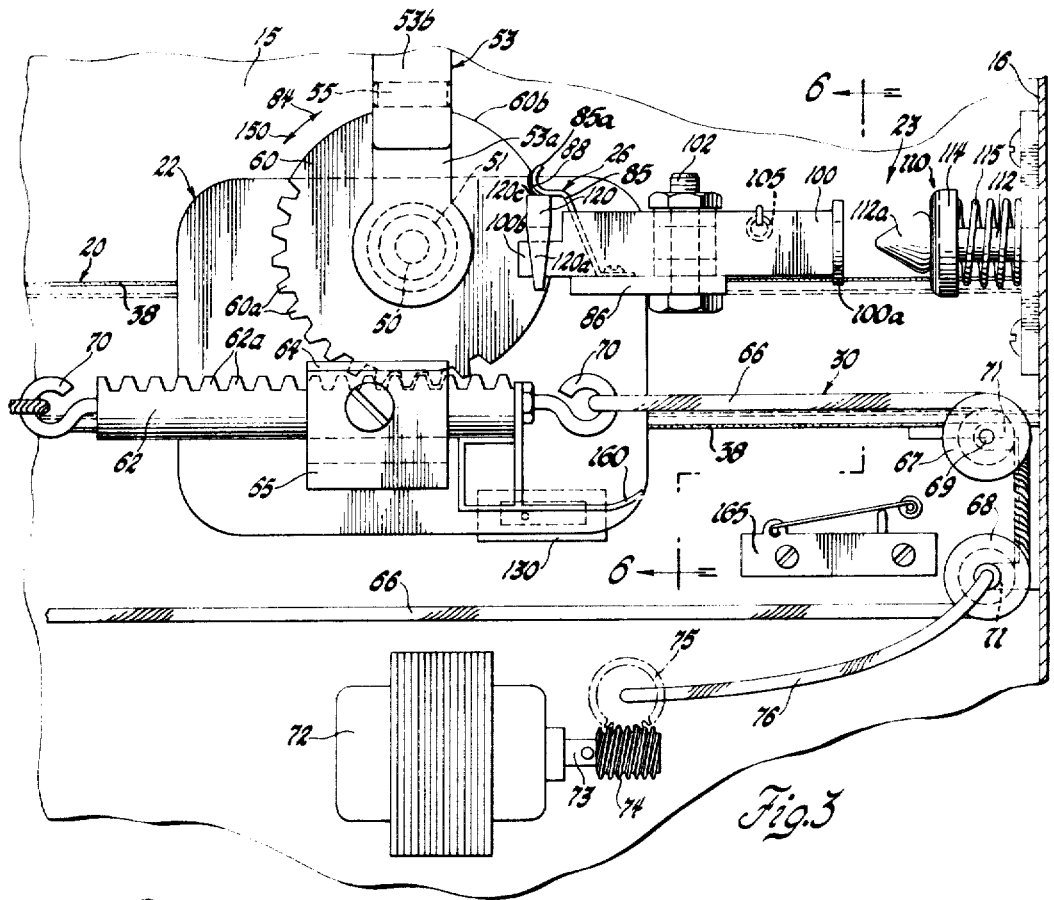
FIGURE 3 is a fragmentary side elevational view of part of the window wiping apparatus and looking in the direction of the arrows 3—3 of FIGURE 2.

The present invention provides novel window wiping apparatuses for wiping and cleaning a window of a vehicle. Although the window wiping apparatuses of the present invention could be used for cleaning various windows including the front window or windshield of a vehicle, they are particularly susceptible for use in cleaning the rear window of a station wagon vehicle and thus, for the purposes of illustration, are herein shown and described as being used for that purpose.

As representing a preferred embodiment of the present invention, FIGURES 1–7 of the drawings show a window wiping apparatus A for wiping the rear window 10 of a station wagon 12. The station wagon 12 includes a rear tailgate 13 which is suitably supported in a conventional manner for movement about a horizontal axis between a closed position, as shown in FIGURE 1, and a open position in which it is generally horizontally disposed. The tailgate 13 supports the rear window 10 for movement between closed and open positions, the windows, when in its closed position, projecting upwardly above the upper end 13a of the tailgate 13. The tailgate 13 includes inner, outer, and side walls 14, 15 and 16 and 17, respectively, which define a chamber 18 in which the window cleaning apparatus A is disposed. The outer wall 15 of the tailgate 13 is spaced from the plane of the rear window 10 and defines therewith an elongated opening or slot through which a wiper 19 of the window cleaning apparatus A may pass.

The window cleaning apparatus A comprises, in general, an elongated support means or guide track 20, a carriage 22 supported by the guide track 20 for linear movement in opposite directions therealong between first and second positions during running operation of the apparatus and to a third or rest position when running operation is being terminated, a releasable latching mechanism 23 for holding the carriage 22 against movement relative to the tailgate 13 when the carriage 22 is in its rest position, the wiper 19 for wiping the window and which is pivotally supported by the carriage 22 for movement between a parked position in which it is substantially horizontally disposed and located in the chamber or recess 18 within the tailgate 13 and an operating position in which it is substantially vertically disposed, a releasable latching means 26 for holding the wiper 19 against movement relative to the carriage 22 when the latter is in its operating position, and a drive means 30 operatively connected with the wiper 19. The drive means 30, when energized, is operable to first move the wiper 19 from its parked position toward its operating position while the carriage 22 is held in its rest position by the latching mechanism 23 until the latching means 26 latches the wiper 19 in its operating position and to unlatch the latching mechanism 23 to permit movement of the carriage 22 relative to the tailgate 13, and then to move the wiper 19 and carriage 22 as a unit in opposite directions between their first and second positions during running operation. The drive means 30, when running operation is being terminated, is operable to move the carriage 22 to its rest position and then to move the wiper 19 from its operating position to its parked position.

Referring to FIGURES 2 and 3, the guide track 20 extends horizontally within the tailgate 12 and at its opposite ends is suitably secured to the side walls 16 and 17 of the tailgate 13. The guide track 20, as best shown in FIGURE 6, has longitudinally extending grooves or channels 33 and 34 at its upper and lower sides which respectively receive rollers 35 and 36 carried by the carriage 22. Preferably, disposed within each of the grooves 33 and 34 is a U-shaped insert 38 made from a suitable anti-friction material to decrease the friction between the rollers 35 and 36 and the guide track 20.

The carriage 22 is supported by the guide track 20 for linear movement in opposite directions therealong, the movement being guided by the engagement between the rollers 35 and 36 and the inserts 38 within the grooves 33 and 34 of the guide track 20. The carriage 22 comprises a generally vertically disposed support plate 40 to which upper and lower horizontal spaced support flanges 41 and 42 are welded. The support flanges 41 and 42 straddle the guide track 20 and respectively carry stub shafts 43 and 44 on which the rollers 35 and 36 are rotatably journaled.

The carriage 22 pivotally supports the wiper 19 for movement relative thereto between an operating position, as shown by the solid lines in FIGURE 1, in which the wiper 19 is vertically disposed and a parked position, as shown by the phantom lines in FIGURE 1, in which the wiper 19 is generally horizontally disposed and located within the chamber or recess 18 in the tailgate 13 so as to be concealed from view. To this end, the support plate 40 of the carriage 22 carries a non-rotatable shaft 50 which extends transversely thereof. Rotatably journaled on the shaft 50 is a bushing 51 to which the wiper 19 is fixed.

The wiper 19 includes a wiper arm 53 and a wiper blade assembly 54. As best shown in FIGURE 3, the wiper arm 53 has a mounting section 53a which is fixed to the bushing 51 and a wiper blade assembly carrying section 53b pivotally connected to the section 53a by a pivot pin means 55 and which is biased by a conventional spring (not shown) located within the arm 53 toward the window 10. The wiper blade assembly 54 includes a blade carrying section 54a which is secured to the upper end of the section 53b of the wiper arm 53 and which carries a flexible wiper blade 54b engageable with the rear window 10.

The wiper 19 is adapted to be moved from its parked position toward its operating position when operation of the window cleaning apparatus A is initiated by energizing the drive means 30. The drive means 30 comprises a pinion gear or gear sector 60 which is fixed to the bushing 51 rotatably journaled on the non-rotatable shaft 50 carried by the carriage 22. The gear 60 has a plurality of circumferentially spaced gear teeth 60a along a portion of its periphery and has a smooth peripheral surface 60b along the remaining portion of its periphery. The teeth 60a of the gear 60 are in meshed engagement with teeth 62a on the upper side of a rack 62 which is supported by the carriage 22 for linear movement relative thereto. The rack 62 has a generally circular cross-sectional shape and is slidably supported by an arcuate bushing 64 fixed to a U-shaped support bracket 65 carried by the support plate 40 of the carriage 22.

The drive means 30 further includes a cable 66 trained around upper and lower pulleys 67 and 68 adjacent the side walls 16 and 17 of the tailgate 13. The ends of the cable 66 are suitably secured to the opposite ends of the rack 62 via eye bolts 70. The pulleys 67 and 68 are each fixed to a shaft 69, the shafts in turn being each suitably rotatably supported by a bracket 71 attached to the adjacent side wall 16 or 17 of the tailgate 13.

The cable 66 is adapted to be moved in opposite direction by a suitable or conventional reversible electric motor 72 having an output shaft 73 to which a worm gear 74 is fixed. The worm gear 74 is in meshed engagement with a worm wheel 75 rotatably supported by the tailgate 13, the worm wheel 75 in turn being drivingly connected with the shaft 69 of the pulley 68 adjacent the side wall 16 via a flexible cable 76. The pulley 68 adjacent the side wall 16 serves as the drive pulley for the cable 66, the other pulleys being idler pulleys.

The drive means 30 is operable, when energized, to sequentially move the wiper 19 relative to the carriage 22 from its parked position to its operating position, release the releasable latching mechanism 23 and then to linearly move the wiper 19 and the carriage 22 as a unit in opposite directions along the guide track 20. As best shown in FIGURE 5, when the drive means 30 is energized the drive pulley 68 is caused to rotate in the direction of the arrow 80. Rotation of the drive pulley 68 in this direction causes the upper part of the cable 66 and the rack 62 to be moved in the direction of the arrow 82. Movement of the rack in this direction causes the gear sector 60 to be rotated in the direction of the arrow 84. The carriage 22 at this time is in its rest position and remains stationary due to the provision of the releasable latching mechanism 23, as will be hereinafter more fully described. Rotation of the gear sector 60 in the direction of the arrow 84 causes the wiper 19 to be moved from its parked position, as shown by the phantom lines in FIGURE 1 and the solid lines in FIGURE 5 toward its operating position, as shown by the solid lines in FIGURES 1 and 3.

When the wiper 19 reaches its operating position in which it is substantially vertically disposed, the releasable latch means 26 will latch the gear sector 60 to the carriage 22 and hold the gear sector 60 against movement relative to the carriage 22. The latch means 26 comprises a latch member 85 in the form of a relatively stiff leaf spring. The leaf spring 85 has one end secured to a generally horizontally disposed support flange 86 carried by the support plate 40 of the carriage 22 and is self-biased toward the periphery of the gear sector 60 so as to maintain its detent end 85a in engagement therewith. The leaf spring 85 rides along the non-tooth portion 60b of the gear sector 60 when the latter is rotated to move the wiper 19 from its parked position toward its operating position. When the wiper 19 reaches its operating position, the detent end 85a of the leaf spring 85 will detent or move into a recess or notch 88 in the periphery of the gear 60, the side walls of the recess 88 serving as a catch.

Figure 4:
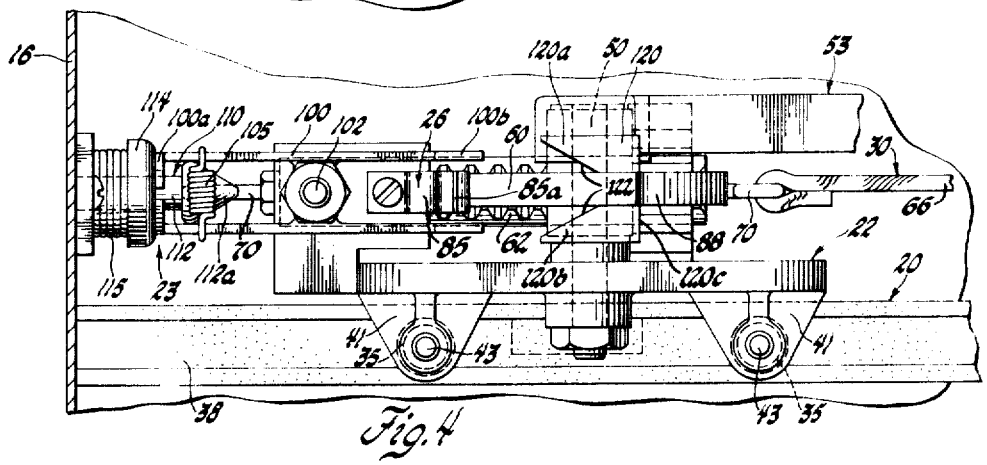

The gear 60 is also operable to release the releasable latching mechanism 23 as the wiper 19 approaches its operating position. The carriage 22 is normally disposed in a rest position, as shown in FIGURE 5, and latched to the adjacent side wall 16 of the tailgate 13 by the releasable latching mechanism 23. The latching mechanism 23 comprises a pair of latch members or fingers 100 which are pivotally connected intermediate their opposite ends to the support flange 86 for movement about a generally vertical axis by a pivot means 102. As best shown in FIGURES 4 and 6, the latch members 100 at their ends adjacent the side wall 16 are provided with transversely extending, semi-circularly shaped flanges 100a and at their opposite ends 100b straddle or are disposed on opposite sides of the gear 60. The ends 100a of the latch members 100 are biased toward each other by a tension spring 105 having its opposite ends connected with the latch members 100 at a location spaced from the pivot means 102.

The releasable latching mechanism 23 further includes a catch means 110 carried by the side wall 16 of the tailgate 13. The catch means 110 comprises a catch member 112 having a conical shaped head 112a, an annular washer or bushing 114 disposed behind the head 112a and a compression spring 115 having its opposite ends in abutting engagement with the side wall 16 of the tailgate 13 and the washer 114. The compression spring 115 serves to bias the washer 114 toward and into engagement with the underside of the conical head 112a.

The latch members 100 are movable between a latched position and an unlatched or release position. They are biased by the spring 105 toward their latched position, as shown in FIGURE 4, in which the flanges 100a are disposed or hooked behind the head 112a of the catch member 112 to hold the carriage 22 against movement relative to the tailgate 13.

The latch members 100 are movable from their latched position in opposition to the biasing force of the spring 105 to their release position, as shown in FIGURE 2, in which they are no longer effective to hold the carriage 22 against movement relative to the tailgate 13 by the gear 60 as the wiper 19 approaches its operating position. To this end, the gear 60 carries a cam means 120 having leg or leg portions 120a and 120b disposed on opposite sides of the gear 60 and whose inner sides 122 are spaced from the adjacent sides of the gear 60. The inner sides 122 of the legs 120a and 120b are linearly tapered so as to converge toward each other proceeding from their free end toward their end secured to the gear 60. As the wiper 19 approaches its operating position, the tapered inner sides 122 of the legs 120a and 120b engage the ends 100b of the latch members 100 to move these ends toward each other. Movement of the ends 100b toward each other causes the flanges 100a at the opposite ends to move away from each other to a position in which they are located radially outwardly of the base of the conical head 112a. When in this latter position, the carriage 22 can be moved relative to the tailgate 13.

When the wiper 19 is latched in its operating position and the carriage 22 released for movement relative to the tailgate 13, further movement of the cable 66 will cause the wiper 19 and the carriage 22 to be moved as a unit along the guide track 20. Movement as a unit is effected since the gear 60 is latched against relative movement with respect to the carriage 22 by the latch means 26, which in turn prevents relative movement between the rack 62 and the carriage 22.

The drive means 30 is operable during running operation of the apparatus A to linearly move the wiper 19 and carriage 22 in opposite directions along the guide track 20 between first and second positions, these positions being indicated by the vertical solid and phantom line positions of the wiper 19 in FIGURE 1. Reversal of movement of the carriage 22 and wiper 19 as they reach their first and second positions is effected by limit switches 130 and 132 suitably carried by the tailgate 13 and located adjacent its side walls 16 and 17. The switches 130 and 132 are disposed within the path of movement of the carriage 22 and are adapted to be engaged and tripped by the carriage 22 when the latter is in its first and second positions, respectively. The limit switches 130 and 132 can be of any suitable or conventional construction and are schematically shown in FIGURE 7. The manner in which they effect reversal of movement of the drive means 30 will be hereinafter more fully described.

The drive means 30 is also operable to move the carriage 22 and wiper 19 to the rest position of the carriage 22, as shown in FIGURES 4 and 5 or as indicated by the phantom line a in FIGURE 1, in which they are spaced from and located outboard of the first position and then to move the wiper 19 relative to the carriage 22 to its parked position when wiper operation is being terminated. The carriage 22 and wiper 19 are first moved to the rest position of the carriage 22 so as to enable the releasable latching mechanism 23 to be actuated to hold the carriage 22 against movement relative to the tailgate 13 while the wiper 19 is being moved to its parked position.

As the carriage 22 moves toward its rest position the flanges 100a of the latch members 100 pass freely over the conical head 112a of the catch member 112 and engage the washer 114 to move the same toward the side wall 16 in opposition to the biasing force of the compression spring 115. When the spring 115 is fully compressed further movement of the carriage 22 toward the side wall 16 is prevented. The spring 115 and washer 114 thus serve as a yieldable stop. The relative positions of the rack 62 and gear 60 when movement of the carriage is stopped, is the same as that shown in FIGURE 3.

When further movement of the carriage 22 toward the side wall 16 is prevented, the drive means 30, which is still energized, causes the rack 62 to move relative to the carriage 22 in the direction of the arrow 148 from its position shown in FIGURE 3 toward its position shown in FIGURE 5, which in turn causes gear 60 to be rotated in the direction of the arrow 150. As the gear 60 begins to rotate in this direction it causes the upper cam portion 120c of the cam 120, which portion forms a side wall of the recess 88, to engage the detent end 85a of the leaf spring 85 of the latching means 26 to move the same outwardly from the periphery of the gear 60 to release the gear for further rotation in the direction of the arrow 150. The force exerted on the gear 60 to rotate the same by the cable 66 after movement of the carriage 22 is stopped is greater than the biasing force of the leaf spring 85 preventing rotation of the gear 60, although the latter force is greater than the forces tending to rotate the gear 60 during running operation of the wiper 19.

When the gear 60 is rotated in the direction of the arrow 150, the wiper 19 is moved from its operating position toward its parked position. When the wiper 19 reaches its parked position, an actuator or trip member 160 carried by the rack 62 is engageable with a limit switch 165 to move the latter to its open position, which in turn will effect de-energization of the drive motor 72, and in a manner to be presently described.

A complete cycle of operation of the window wiping apparatus A will now be described with reference to the schematic electrical control system shown in FIGURE 7. The electrical control system includes a battery 200 having one side connected to the suitable ground and on-off switch 202 having a pair of switch arms 203 and 204 which are simultaneously movable between an on position, as shown by the dotted line position in FIGURE 7, in which the arm 203 provides a conductive path between wires 206 and 208 and in which the arm 204 provides a conductive path between wires 206 and 209, and an off position, as shown by the solid line position in FIGURE 7, in which the arm 203 interrupts the conductive path between the wires 206 and 208 and in which the arm 204 provides a conductive path between wires 206 and 210. The control system further includes the limit switches 130, 132 and 165 which are movable between closed and opened positions. These limit switches are spring biased toward an open, closed and open positions, respectively, and are in the solid line positions shown in FIGURE 7 when the control system is de-energized.

The control system further includes a relay 215 for controlling operation of relay switches 215–1—215–4, which in turn control the direction of rotation of the motor 72. Each of the relay switches 215–1—215–4 include upper and lower spaced stationary contacts and an intermediate mobile contact spring biased into engagement with one of the two stationary contacts. As shown by the solid lines in FIGURE 7, the mobile contacts of relay switches 215–1 and 215–2 are biased into engagement with upper stationary contact and the mobile contacts of relay switches 215–3 and 215–4 are biased into engagement with the lower stationary contact when the relay 215 is deenergized.

When the window wiping mechanism A is in its parked position, the actuator 160 carried by the rack 62 holds the limit switch 165 in its open position, as shown by the solid line in FIGURE 7, and the carriage 22 holds the limit switch 130 in its closed position, as shown by the solid line in FIGURE 7. The limit switch 132 located adjacent the other side wall 17 of the tailgate 13 is spring biased to its normally closed position, as shown by the solid line in FIGURE 7.

To initiate operation of the window wiping apparatus A the operator will manually move the on-off switch 202 to its on position, as shown by the dotted lines in FIGURE 7. Movement of the on-off switch 202 to this position will complete a circuit D to energize the relay 215. This circuit is from battery 200, wire 206, switch member 203 of switch 202, wire 208, limit switch 130, which is normally and now held in a closed position by the carriage 22, wire 220, relay coil 215, wire 221, normally and now closed limit switch 132, wire 222, to ground. Energization of relay 215 causes the mobile contacts of relay switches 215–1 and 215–2 and 215–3 and 215–4 to be moved from their solid line position to their dotted line positions, as shown in FIGURE 7, in which they are respectively in engagement with the lower and upper stationary contacts.

Movement of mobile contact of relay switch 215–2 into engagement with its lower stationary contact completes a circuit E for energizing the field and armature windings of the motor 72 to cause the output shaft 73 of the latter to be rotated in a first direction. This circuit is from battery 200, wire 206, through switch arm 203 of switch 202, wire 208, normally and now closed limit switch 130, wire 220, the lower stationary contact of relay 215–2, the mobile contact of relay switch 215–2, wire 225, mobile contact of relay switch 215–4, the upper stationary contact of relay switch 215–4, wire 226, field winding 227 of motor 72, wire 228, the upper stationary contact of relay switch 215–3, the mobile contact of relay switch 215–3, wire 230, the armature winding 231 of the motor 72, wire 232 to ground.

The completion of circuit E causes the output shaft 73 of the motor 72 to be rotated in a first direction in which it effects rotation of the drive pulley 68 in the direction of the arrow 80, as shown in FIGURE 5. Rotation of the drive pulley 68 in this direction causes the cable 66 to move the rack 62 in a direction of the arrow 82. As the rack 62 is moved in the direction of the arrow 82, it will slide within the bushing 64 and move relative to the carriage 22, which is held against movement by the latching mechanism 23, and effect rotation of the gear 60 and wiper 19 in the direction of the arrow 84 to move the wiper 19 from its parked position, as shown by the solid lines in FIGURE 5 toward its operating position, as shown by the solid lines in FIGURE 3.

As the gear 60 is rotated in the direction of the arrow 84 the leaf spring 85 of the latching means 26 will ride upon its peripheral surface 60b until the wiper 19 is in a substantially vertical disposition, at which time the recess 88 in the gear 60 will be disposed adjacent the detent end 85a of the leaf spring 85 and the leaf spring 85 will move inwardly into the recess 88 to latch and hold the gear 60 and wiper 19 against movement relative to the carriage 22.

Also, as the wiper 19 approaches its operating position, the legs 120a and 120b of the cam means 120 engage the ends 100b of the latch members 100 of the latch mechanism 23 to move the latter in opposition to the biasing force of the spring 105 from their latched position, as shown in FIGURE 4, to their unlatched position, as shown in FIGURE 2. When the latch mechanism 23 is unlatched from the carriage 22 the latter is free to move along the guide track 20 relative to the tailgate 13.

With the carriage free to move along the guide track 20 and the latch means 26 in its latched position to hold the gear 60 and wiper 19 against movement relative to the carriage 22, further movement of the rack 62 in the direction of the arrow 82 will cause the wiper 19 and the carriage 22 to move as a unit along the guide track 20 toward their second position adjacent the side wall 17 of the tailgate 13, as indicated by the phantom line position of the wiper 19 in FIGURE 1. Movement of the rack 62 and carriage 22 in the direction of the arrow 82 causes the limit switch 165 to be moved to its closed position and the limit switch 130 to be moved toward its open position. Movement of the limit switch 165 to its closed position performs no present function. Movement of the limit switch 130 to its open position de-energizes the hereinbefore described circuits D and E for the relay 215 and motor 72, respectively. Relay 215 and motor 72, however, remain energized due to the provision of holding circuits D', E', which are in parallel with the limit switch 130 and provide a conductive path from wire 208 to wire 220. These circuits by-pass limit switch 130 by providing a conductive path from wire 208, mobile contact of relay switch 215–1, the lower stationary contact of relay switch 215–1 to wire 220.

When the wiper and carriage reach their second position at the end of the travel in the direction of the arrow 82, the carriage 22 will engage and move limit switch 132 from its normally closed position to its open position. This breaks the holding circuits D¹ for the relay 215 and causes the latter to be de-energized. De-enerigzation of the relay 215 effects movement of the mobile contacts of relay switches 215–1—215–4 from their dotted line position to their solid line position shown in FIGURE 7.

Movement of the mobile contacts of the relay switches 215–1 and 215–2 to their solid line position in FIGURE 7 breaks the hereinbefore described holding circuit E' for energizing the field and armature windings of the motor 72 and completes a circuit G for energizing the field and armature windings of the motor 72 to effect the reversal of rotation of the motor 72. This circuit is from battery 200, wire 206, switch arm 204 of switch 202, wire 209, the upper stationary contact of relay switch 215–2, the mobile contact of relay switch 215–2, wire 225, mobile contact of relay switch 215–4, the lower stationary contact of relay switch 215–4, wire 228, field windings 227 of motor 72, wire 226, the lower stationary contact of relay switch 215–3, the mobile contact of relay switch 215–3, wire 230, the armature windings 231 of the motor 72, wire 232 to ground. The completion of the circuit G reverses the direction of current through the field windings 227 in the motor 72 to effect rotation of the motor 72 in a direction opposite to its previous direction.

Rotation of the motor in a reverse direction causes the drive pulley 68 and cable 66 to be moved in the opposite directions, which in turn causes the carriage 22 and wiper 19 to be moved in the direction of the arrow 148 in FIGURE 3 toward their first position, as shown by the solid lines in FIGURE 1. The limit switch 132 will again return to its normally closed position as the carriage 22 and wiper 19 are moved toward their first position, but will not effect energization of the relay 215, since limit switch 130 is still in an open position. When the wiper and carriage again reach their first position, limit switch 130 will be moved to its closed position to effect energization of relay 215 to cause the motor rotation to be reversed. The wiper and carriage will continue to be linearly moved in opposite directions between their first and second positions during running operation so long as the on-off switch 202 is in its on position, as shown by the dotted lines in FIGURE 7.

To terminate operation of the window wiping apparatus A, the operator will move the on-off switch 202 to its off position, as shown by the solid lines in FIGURE 7. Movement of the switch 202 to its off position will effect de-energization of any of the aforedescribed circuits to the motor 72, which may at present be energized, since arm 203 in its solid line position interrupts the conductive path between wires 206 and 208, but will energize a bypass circuit H to wire 225 to keep the motor 72 energized. It should be noted that all circuits for energizing the motor 72 are through wire 225. This by pass circuit is from battery 200, wire 206, arm 204 of switch 202, wire 210, now closed limit switch 165, to wire 225.

The completion of the bypass circuit H to the motor 72 will cause the latter to remain energized and move the carriage 22 past its first position to its rest position, as shown in FIGURES 4 and 5, outboard of the first position, as the carriage 22 is moved in the direction of the arrow 148. If the carriage 22 and wiper 19 were moving in the opposite direction, i.e., in the direction of the arrow 82, when the on-off switch 202 was moved to its off position, they would continue to move in that direction until they reached their second position, whereupon the limit switch 132 would effect reversal of the motor 72 and then move in the direction of the arrow 148 toward their first position and past their first position to their rest position.

As the carriage 22 is being moved to its rest position, the latch members 100 which are held in an unlatched position by the legs 120a and 120b of the cam means 120 pass freely over the catch member 112 and move the washer 114 in opposition to the biasing force of the spring 115 toward the side wall 16 of the tailgate 13. This latter provision provides a stop to prevent further movement of the carriage 22 in the direction of the arrow 148. When movement of the carriage 22 is stopped, the rack 62, which continues to move, moves relative to the carriage 22 and causes the gear 60 to rotate in the direction of the arrow 150. Movement of the gear 60 in this direction causes the cam means 120 to move the leaf spring 85 outwardly of the periphery of the gear 60 to unlatch the same from the gear 60 and to simultaneously disengage the ends 100b of the latch members 100 to allow the spring 105 to move the latch members 100 to their latched position in which the flanges 100a are disposed behind the head 112a of the catch member 112. Further movement of the rack 62 causes the gear to pivot the wiper 19 from its operating position to its parked position within the chamber 18 of the tailgate 13. As the wiper reaches its parked position the limit switch actuator 160 carried by the rack 62 engages the limit switch 165 to move the same to its open position.

When the limit switch 165 is moved to its open position, it breaks the hereinbefore described by-pass circuit H, which kept the motor 72 energized, and causes the motor to be now deenergized and stop further movement of the wiper 19.

As representing another embodiment of the present invention, FIGURES 8–10 show a window wiping apparatus B. The window wiping apparatus B is of an identical construction to the window wiping apparatus A except that the window wiping apparatus B employs a wiper 250, pinion gear or gear sector 251, carriage 252, and latch mechanism 253 of a somewhat different construction. The parts of the window wiping apparatus which are identical to the corresponding parts of the window wiping apparatus A will be given the same reference numerals.

The carriage 252 is supported by the guide rail 20 for linear movement in opposite directions therealong, and in the same manner that the carriage 22 of the window wiping apparatus A is supported by the guide rail 20. The carriage 252 comprises a pair of generally vertically extending, spaced side walls 256 and 257. The side wall 256 also has upper and lower generally horizontally extending portions 256a and 256b, the lower or bottom wall portion 256b slidably supporting a rack 62 for linear movement relative thereto.

The rack 62 has a plurality of teeth 62a which are in meshed engagement with teeth 251a of a toothed portion of the gear 251. The gear 251 is disposed between the sides 256 and 257 of the carriage 252 and is rotatably supported for movement in opposite directions by a pivot pin means 260. The gear 251 is also provided with a flat peripheral side portion 251b having a plurality of spaced lugs 251c extending transversely thereof and to which the arm 262 of the wiper is pivotally connected by a pivot pin means 263. The wiper 250 in all other respects is identical to the wiper 19 of the window wiping mechanism A.

The gear 251 also includes a radially extending ear or lug 265 and a non-tooth portion 251d which is "out of round" with respect to the axis of the pivot means 260. That is, the non-tooth portion 251d has a varying radius of curvature, which progressively decreases from the end of the toothed portion toward the ear 265.

The releasable latching mechanism 253 comprises a catch means or member 275 which is suitably secured to the side wall 16 of the tailgate 13 and which extends transversely thereof and parallel to the guide track 20. The catch member 275 at its end remote from the wall 16 is provided with a tapered lower side 275a and has a notch 275b in its upper side for receiving the detent or hook end 280a of a latch means or member 280.

The latch member 280 is disposed between the side walls 256 and 257 of the carriage 252 and is pivotally connected for movement relative thereto by a pivot pin means 282 for movement about an axis 282a. The latch member 280 has a notch 284 at its side facing the catch member 275 for receiving the catch member 275, the notch 284 being defined in part by a lower side wall surface 284a which is tapered so as to be complementary with the tapered lower side 275a of the catch member 275. The latch member 280 at its other side has a notch 285 for receiving the ear 265 of the gear 251. The notch 285 is shaped complementary with the shape of the ear 265 of the gear 251 and includes a flat planar upper surface 285a, a side surface 285b extending generally normal to the planar upper surface 285a and an arcuate bottom surface 285c.

The latch member 280 is movable between a first position, as shown in FIGURE 9, in which the detent end 280a thereof is received in the notch 275b in the catch member 275 to latch or hold the carriage 252 against movement relative to the tailgate 13 and in which it is disengaged from the ear 265 of the gear 251, and a second position, as shown in FIGURE 8, in which its detent end 280a is disengaged from the catch member 275 to permit the carriage 252 to be linearly moved along the guide track 20 and in which the ear 265 is received with the notch 285 to latch or hold the wiper 250 in its operating position. As shown in FIGURES 8 and 9, the pivot means 282 for pivotally supporting the latch member 280 for pivotal movement relative to the carriage 252 is located off-center with respect to the center of the latch member 280. That is, the pivot means 282 is located closer to the side having the notch 285 than the side having the notch 284 and thus, the latch member 280 will be biased by the force of gravity in the direction of the arrow 290 towards its latched position.

The operation of the window wiping apparatus B, except for the manner in which the wiper 250 is latched in its operating position and the carriage 252 is latched in its rest position, is identical to the operation previously described in connection with the window wiping apparatus A. Therefore, only the manner in which wiper 250 is latched in its operating position and the manner in which the latch mechanism 253 is operated to latch the carriage to the tailgate 13 will be described in detail.

The latch member 280 is adapted to be moved in the direction of the arrow 291 from its first position, as shown in FIGURE 9, toward its second position, as shown in FIGURE 8, in response to the wiper 250 being moved from its parked position toward its operating position when the rack 62 is moved in the direction of the arrow 300 to cause the gear 251 to be rotated in the direction of the arrow 301. As the wiper 250 approaches its operating position, the ear 265 on the gear 251 will be received within the notch 285 and cause the latch member 280 to be moved in the direction of the arrow 291. Movement of the latch member 280 in this direction causes the detent end 280a thereof to move out of the notch 275b in the catch member 275 and release the carriage 252 for movement along the guide track 20. Also as the latch member 280 moves in this direction its tapered side surface 284a will engage the tapered under side 275a of the catch member 275 whereby the carriage 252 will be cammed away from the catch member 275 to permit the latch member 280 to be further rotated so that the ear 265 can be fully received within the notch 285.

When the wiper 250 is in its operating position, as shown in FIGURE 8, the ear 265 on the gear 251 is fully received within the notch 285 of the latch member 280 and the latter functions to latch or hold the gear 251 against further movement relative to the carriage 252. As is apparent in FIGURE 8, the gear sector 251 and hence, the wiper 250 are latched by the latch member 280 against further movement in the direction of the arrow 301 due to the engagement between the ear 265 and the side surface 285b of the notch 285. The wiper 250 is also latched against movement in the opposite direction, as indicated by the arrow 302, because the contact or engagement between the upper surface 285a of the notch 285 and the adjacent surface of the ear 265 is radially or substantially radially perpendicular with respect to the pivot axis 282a of the pivot means 282 and located to the right of or over-center with respect to a vertical plane passing through the pivot axis 282a. Substantial movement of the latch member 280 in the direction of the arrow 290 due to gravity is prevented due to the end portion 280b thereof engaging the underside of the ear 265, as viewed in FIGURE 8.

When running operation of the wiper 250 is being terminated and the carriage 252 is being moved to its rest position in the direction of the arrow 305, the tapered side 284a of the notch 284 in the latch member 280 engages the tapered underside 275a of the catch member 275. This causes the latch member 280 to be pivoted about its pivotal axis 282a in the direction of the arrow 290 and to relieve the force between the flat side of the ear 265 and the surface 285a, these surfaces being in engagement with each other, since the frictional engagement between the wiper blade and window tends to rotate the gear 251 in the direction of the arrow 302 as the carriage is moved toward its rest position. The clearance between the sides of the notch 285 and the ear 265 is such that limited pivotal movement of the latch member 280 is permitted prior to the end portion 280b engaging the ear 265 and camming the wiper 19 toward its parked position and causing the ear 265 to be disengaged from the notch 285.

When the carriage 252 reaches its rest position, the innermost side surface portion of the notch 284 engages the end of the catch member 275 whereby further movement of the carriage 252 is prevented. When movement of the carriage 252 is stopped, the rack 62, which continues to move in the direction of the arrow 305, since the motor 72 is still energized, causes the gear 251 to rotate in the direction of the arrow 302. Movement of the gear 251 in this direction will move the wiper 250 to further move towards its parked position and cause the "out of round" portion 251d to engage the end 280b of the latch member 280 and rotate the same to its first position, as shown in FIGURE 9. The wiper 250 engages a suitable limit switch (not shown) carried by the tailgate 13 and which is like the limit switch 165 of the apparatus A when in its parked position. It also engages a horizontal surface 310 on the carriage when in its parked position. It should also be noted that the "out of round" portion 251d of the gear 251 adjacent the teeth 251a when the latch member 280 is in its first position, as shown in FIGURE 9, is engaged with the end portion 280b and functions to prevent the latch member 280 from being pivoted in the direction of the arrow 291. Thus, in order for the latch member 280 to be moved to release the carriage 252 from the catch member 275, it is necessary to first rotate the gear 251 until the ear 265 thereof is adjacent to the end portion 280b of the latch member 280.

It should be understood that a suitable over-center spring connected with the latch member 280 and carriage 252 could be employed for biasingly holding the latch member in either of its first or second positions if desired. It should also be noted that by latching the carriages of the wiper apparatuses A and B to the tailgate 13 movement of the same relative to the tailgate and damage thereto when opening and closing the tailgate 13 is prevented.

Although the illustrated embodiments hereof have been described in great detail, it should be apparent that certain modifications, changes, and adaptations may be made in the illustrated embodiments and that it is intended to cover all such modifications, changes and adaptations which come within the spirit of the present invention.

What is claimed is:

1. A window cleaning apparatus for cleaning a window of a vehicle comprising: an elongated support means; a carriage supported by said support means for linear movement in opposite directions therealong; a wiper for wiping the window and which is pivotally supported by said carriage for movement relative thereto between a parked position and an operating position in which it is substantially vertically disposed; a drive means operable when said wiper is in its operating position to linearly move said carriage and said wiper as a unit in opposite directions during running operation thereof; releasable latching means for holding said carriage against movement relative to said vehicle when the carriage is in a rest position at the end of its travel upon running operation being terminated; said drive means also being operable to move said wiper between its parked and operating positions relative to said carriage while the latter is in its rest position and to release said releasable latching means as said wiper reaches its operating position to permit said carriage and wiper to be thereafter moved as a unit during running operation.

2. A window cleaning apparatus for cleaning a window of a vehicle comprising: an elongated support means; a carriage supported by said support means for linear movement in opposite directions therealong and which is adapted to be moved between first and second positions during running operation and to a rest position outboard of its first position when running operation is being terminated; a wiper for wiping the window and which is pivotally supported by said carriage for movement relative thereto between a parked position and an operating position in which it is substantially vertically disposed; first releasable latching means for latching said wiper in its operating position when moved thereto; second releasable latching means for latching said carriage to the vehicle when in its rest position; and a drive means operatively connected with said wiper and being operable to sequentially move said wiper from its parked position toward its operating position while said carriage is latched in its rest position, effect release of said second latching means as said wiper reaches its operating position, move said wiper and carriage as a unit between said first and second positions during running operation to effect a wiping of the window, and when running operation is terminated being operable to move said carriage and wiper as a unit to said rest position and then effect a release of said first latch means and actuation of said second latching means and movement of said wiper relative to said carriage from its operating position toward its parked position.

3. In combination with an automotive vehicle having a window and means defining an elongated recess adjacent its lower edge; a window cleaning apparatus for cleaning the window and which is adapted to be disposed within said recess and concealed when not in use; said window cleaning apparatus comprising an elongated guide track carried by the vehicle and extending substantially parallel with said window, a carriage supported and guided by said guide track for linear movement in opposite directions therealong and which is adapted to be linearly moved between first and second positions during running operation of the apparatus and to a rest position spaced from and located outboard of its first position and in which it engages a stop on the vehicle when running operation is terminated, a wiper for wiping the window and which is fixed to a pivot means pivotally supported by said carriage, said wiper being pivotable relative to said carriage between a parked position in which it is disposed within said recess and an operating position in which it is substantially vertically disposed, a drive means including a pinion gear fixed to said pivot means and which is adapted to be rotated by a rack slidably supported by said carriage to move said wiper between its positions, a first releasable latching means cooperably engageable with said gear to releasably hold the latter against movement relative to the carriage when the gear is rotated to position said wiper in its operating position, a second releasable latching means for latching said carriage to said vehicle when the carriage is in its rest position, said second latching means including cooperably engageable latch and catch members carried by the carriage and vehicle, respectively, said latch member being biased toward a latched position in which it is cooperably engageable with said catch member to hold said carriage against movement relative to said vehicle, cam means carried by said pinion gear for effecting movement of said latch member of said second latching means from its latched position toward an unlatched position in which it is released from said catch member when the pinion gear is rotated to position the wiper in its operating position, said drive means further including means operatively connected with said rack and being operable when initially energized to move said rack relative to said carriage to cause said pinion gear to be rotated to move said wiper toward its operating position until said first latch means latches said pinion gear against further movement and cause said cam means on the pinion gear to move said latch member to its unlatched position, and thereafter to cause said wiper and carriage to be moved as a unit between said first and second positions; said drive means being operable to move said wiper and carriage as a unit toward said rest position when running operation is terminated until said carriage engages said stop whereupon said drive means causes said rack and pinion gear to be moved to effect release of said first latching means and to rotate said pinion gear to move said wiper from its operating position toward its parked position.

4. A window cleaning apparatus as defined in claim 3 wherein said second latching means comprises a pair of latch members pivotally connected by a pivot means intermediate their ends to said carriage for movement between latched and unlatched positions, said latch members having one of their ends biased toward each other toward the latched position by a spring operatively connected therewith and having their other ends disposed adjacent the sides of the pinion gear, and wherein said cam means includes cam leg portions located on opposite sides of the pinion gear and whose sides facing the adjacent sides of the pinion gear are tapered theretoward and engageable with the other ends of the latch members of said second latching means to cause the same to be cammed toward each other in opposition to the biasing force of said spring to move said one ends toward the unlatched position as said pinion gear is rotated to position the wiper in its operating position.

5. A window cleaning apparatus as defined in claim 3 wherein said latch member of said second latching means is pivotally connected to said carriage by a pivot means at a location which is laterally spaced from its center, said latch member of said second latching means including a detent at one end thereof for cooperably engaging said catch member on the vehicle and a notch at its other end, and wherein said pinion gear has an ear extending radially of its periphery and shaped complementary with the notch, said ear being received within said notch and effecting movement of said latch member to its unlatched position in which said detent thereof is disengaged from the catch member as said pinion gear is rotated to position the wiper in its operating position.

6. A window cleaning apparatus as defined in claim 3 wherein said latch member of said first latch means comprises a leaf spring secured at one end to said carriage and having a free end self-biased into engagement with the periphery of the pinion gear.

7. In combination with a vehicle having a tailgate movable between open and closed positions and which supports a rear window and is provided with a substantially horizontally disposed open top recess adjacent the lower edge of the window, a window cleaning apparatus carried by the tailgate for cleaning the rear window, said window cleaning apparatus comprising: an elongated support means carried by said tailgate; a carriage supported by said support means for linear movement in opposite directions therealong and which is adapted to be moved between first and second positions during running operation and to a rest position outboard of its first position when running operation is being terminated; a wiper for wiping the window and which is pivotally supported by said carriage for movement relative thereto between a parked position and an operating position in which it is substantially vertically disposed; first releasable latching means for latching said wiper in its operating position when moved thereto; second releasable latching means for latching said carriage to the tailgate when in its rest position; and a drive means operatively connected with said wiper and being operable to sequentially move said wiper from its parked position toward its operating position while said carriage is latched in its rest position, effect release of said second latching means as said wiper reaches its operating position, move said wiper and carriage as a unit between said first and second positions during running operation to effect a wiping of the window, and when running operation is terminated being operable to move said carriage and wiper as a unit to said rest position and then effect a release of said first latch means and movement of said wiper relative to said carriage from its operating position toward its parked position.

References Cited

UNITED STATES PATENTS

| | | | |
|---|---|---|---|
| 1,655,670 | 1/1928 | Waters | 15—250.24 X |
| 2,785,430 | 3/1957 | Dyer et al. | 15—250.17 |
| 3,078,494 | 2/1963 | Price | 15—250.17 |
| 3,428,996 | 2/1969 | Carpenter | 15—250.24 |

ROBERT W. MICHELL, Primary Examiner

U.S. Cl. X.R.

15—250.24, 250.29